United States Patent [19]

Yates

[11] Patent Number: 5,215,707
[45] Date of Patent: Jun. 1, 1993

[54] INSTRUMENT THIMBLE TUBE SHROUD

[75] Inventor: Jack Yates, Richland, Wash.

[73] Assignee: Siemens Power Corporation, Bellevue, Wash.

[21] Appl. No.: 758,988

[22] Filed: Sep. 10, 1991

[51] Int. Cl.$^5$ .............................................. G21C 17/00
[52] U.S. Cl. ..................................... 376/254; 376/245; 376/352; 376/292
[58] Field of Search ............... 376/254, 292, 352, 245; 976/DIG. 236, DIG. 238, DIG. 207

[56] References Cited

U.S. PATENT DOCUMENTS

| 4,017,357 | 4/1977  | Patterson, Jr.      | 176/61  |
| 4,352,778 | 10/1982 | Arnaud et al.       | 376/365 |
| 4,505,877 | 3/1985  | Rion                | 376/352 |
| 4,664,879 | 5/1987  | Blaushild           | 376/352 |
| 4,716,004 | 12/1987 | Merkovsky et al.    | 376/203 |
| 4,716,017 | 12/1987 | Kerrey              | 376/446 |
| 4,717,529 | 1/1988  | Merkovsky et al.    | 376/245 |
| 4,751,039 | 6/1988  | Delevallee et al.   | 376/261 |
| 4,778,647 | 10/1988 | Gasparro            | 376/347 |
| 4,798,699 | 1/1989  | Cerni et al.        | 376/327 |
| 4,820,058 | 4/1989  | Wilson et al.       | 376/327 |
| 4,822,558 | 4/1989  | Merkovsky et al.    | 376/347 |
| 4,839,135 | 6/1989  | Merkovsky           | 376/254 |
| 4,859,407 | 8/1989  | Nylund              | 376/446 |
| 4,859,408 | 8/1989  | Kerrey              | 376/450 |
| 4,888,149 | 12/1989 | Bryan               | 376/287 |
| 4,897,239 | 1/1990  | Planchard et al.    | 376/254 |
| 4,960,561 | 10/1990 | Gérard et al.       | 376/352 |
| 4,975,241 | 12/1990 | Haslinger et al.    | 376/352 |
| 4,990,304 | 2/1991  | Rylatt              | 376/434 |
| 5,071,617 | 12/1991 | Bryan et al.        | 376/352 |

FOREIGN PATENT DOCUMENTS 3275999 11/1988 Japan .................................. 376/277

Primary Examiner—Donald P. Walsh
Assistant Examiner—Chrisman D. Carroll
Attorney, Agent, or Firm—Ira Lee Zebrak

[57] ABSTRACT

An instrument thimble tube shroud is disclosed which has a central cup surrounding an instrument thimble tube to prevent fluid flow about the thimble tube from causing excessive vibration and wear. A plurality of arms extend radially from the cup and have locking pads disposed at the end of each arm, springs extending from the pads engaging recesses in an adjacent fuel assembly nozzle to lock the shroud in position and prevent movement of the shroud or rotation due to aggressive fluid flow. Utilizing the inventive shroud prevents vibration and damage to the instrument thimble tube passing therethrough, enhancing life of the instrumentation and allowing continued observation of dynamics within a nuclear reactor.

11 Claims, 3 Drawing Sheets 5,215,707

INSTRUMENT THIMBLE TUBE SHROUD

TECHNICAL FIELD

This invention relates to in-core instrument thimble tubes for nuclear reactors and more particularly to an instrument thimble tube shroud which surrounds the tube to reduce flow induced vibrations.

BACKGROUND

Typically, a nuclear reactor has a vessel containing a core made up of a plurality of fuel assemblies. The lower regions of the fuel assemblies include narrow annuli within a fuel assembly flow distribution plate and a nozzle block. In-core instrumentation for monitoring reactor operations is supplied through the vessel and distribution plate into the core and reside in one or more thimble guide tubes which provide a guide path for the insertion of the instrumentation into the core. The instruments may be movable within the thimble guide tubes to monitor operation at various axial locations in the fuel assemblies. Typically, a small amount of the reactor coolant water circulates through the instrument thimble tube as well as about the fuel rod assembly.

It has been found that the coolant water flow through the narrow annuli between a flow distribution plate and the core lower support plate and around the thimble guide tubes, at the entry point of the instrumentation into the thimble guide tube, causes vibration and interaction between the thimble tube and adjacent structures which cause fretting wear and damage to the instrumentation, which may result in premature failure of the instrumentation.

SUMMARY OF INVENTION

It is an object of the present invention to provide means to protect the in-core instrumentation from vibration damage.

It is another object to prevent damage to the in-core instrumentation yet allow fluid flow through the instrument thimble tube for proper instrument cooling.

It is a further object of the present invention to provide means to prevent instrument vibration damage through incorporation of an instrument thimble tube shroud having anti-rotation means.

These and other objects of the present invention are achieved by providing a thimble tube shroud comprising a cup disposed between a reactor flow distribution plate and a support plate, the cup having passages for diverting part of the fluid flow away from the instrument thimble and part of the fluid flow controllably into the thimble, one or more arms extending from the cup, each arm having means to engage the adjacent fuel assembly structure, the arms preventing rotation of the cup due to fluid flow.

DETAILED DESCRIPTION OF THE INVENTION

Figure 1:
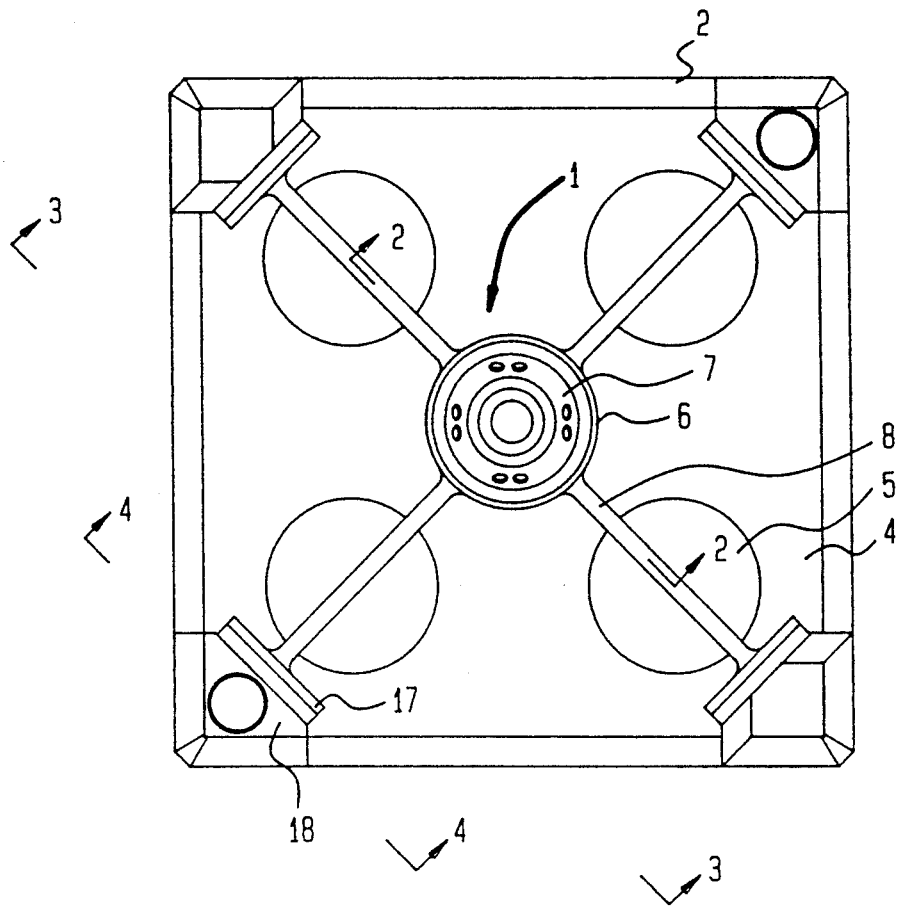
FIG. 1 is a top view of the thimble tube shroud of the present invention.

Referring to FIG. 1, a thimble tube shroud 1 is disposed in a nozzle 2 of a nuclear fuel assembly (not shown). Typically, a pressurized water reactor has a number of fuel assemblies which form a core. Each fuel assembly has a flow distribution plate 3 spaced from a reactor lower support plate 4. The support plate 4 has openings 5 through which the reactor coolant flows. The flow distribution plate assists in a assuring uniform fluid flow about each fuel rod in the assembly to provide efficient cooling. The 10 shroud 1 has a cup portion 6 with a tapered end 7 and arms 8 which extend to support the shroud.

Figure 2:
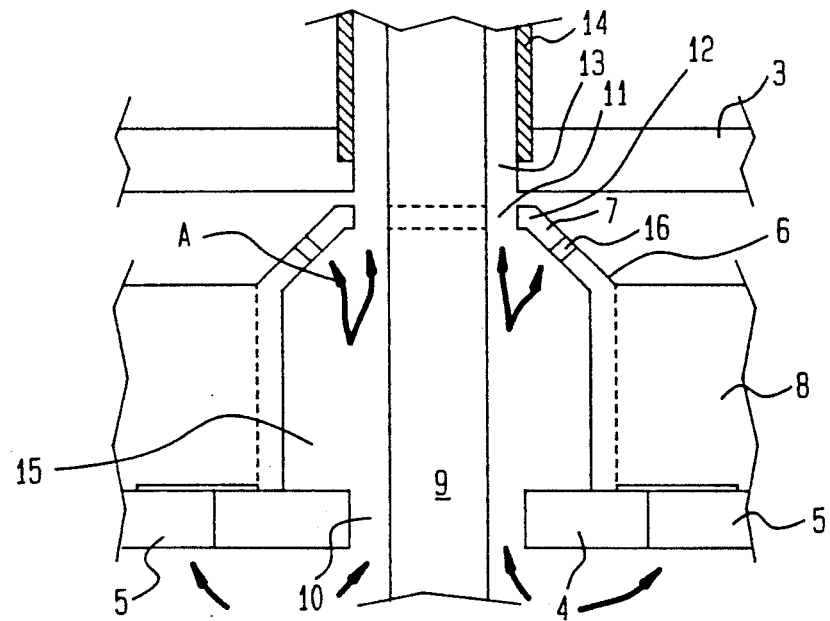
FIG. 2 is a cross sectional view of the thimble tube shroud taken along the line 2—2 of FIG. 1.

Referring to FIG. 2, the cup 6 is disposed between the flow distribution plate 3 and the support plate 4. An instrument thimble tube 9 extends through an opening 10 in the support plate, passing through a hole 11 in a top surface 12 of the cup, and through an opening 13 in the flow distribution plate, into a thimble guide tube 14. The cup has a cylindrical shape and has an inner diametrical opening 15 sufficient to pass the instrument tube therethrough. Sufficient clearance is also provided to allow liquid flow around the instrument tube. For example, the cup may have an inner diametrical opening 15 of about 1.5 inches, with a clearance between the thimble tube 9 and hole 11 of about 0.071 inches.

The cup isolates the thimble tube passing through the openings to prevent excessive wear due to vibratory contact with the adjacent surfaces due to the intensity of the fluid flowing through the fuel assembly. The cup allows flow through and about the instrument thimble tube 9 in a controlled fashion, using passages 16 in the tapered end 7. The arrows A illustrate the flow separation within the cup with part of the flow directed out of the passages 16 and part directed through the hole 11 into the guide tube 14. The cup isolates the instrument tube from cross flow in the spacing between the distribution plate 3 and support plate 4. Consequently, fluid flow is maintained within the guide tube 14 yet is moderated by the passages 16 to a degree which minimizes vibration and potential damage of the instrument thimble tube.

Referring again to FIG. 1, cup 6 has four arms 8 which extend radially. The arms maintain the shroud in an axial orientation and prevent rotation or twisting which could cause the shroud to move and itself damage the instrument thimble tube. Each arm 8 has a locking pad 17 which engages complimentary structures in the nozzle 2.

Figure 3:
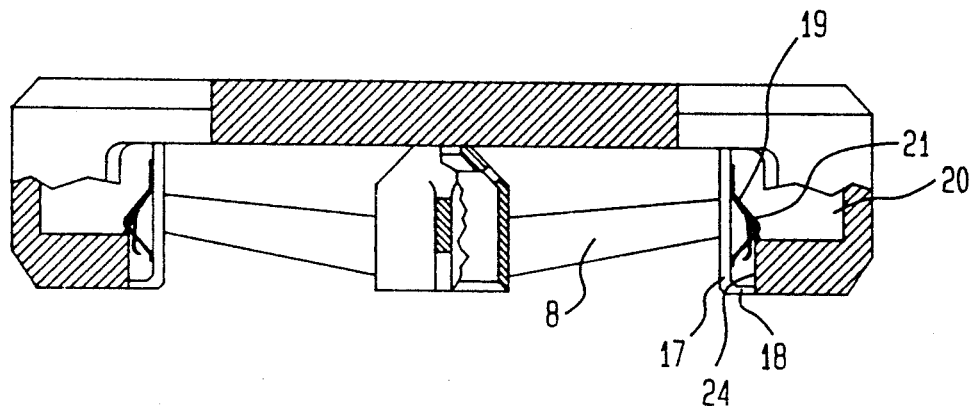
FIG. 3 is a partial cross sectional view showing a lower portion of the thimble tube shroud taken along line 3—3 of FIG. 1.
Figure 4:
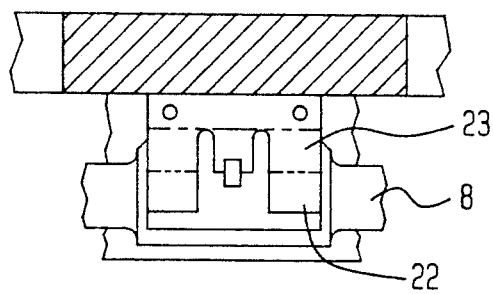
FIG. 4 is an enlarged view an end pad taken along line 4—4 of FIG. 1.
Figure 5A:
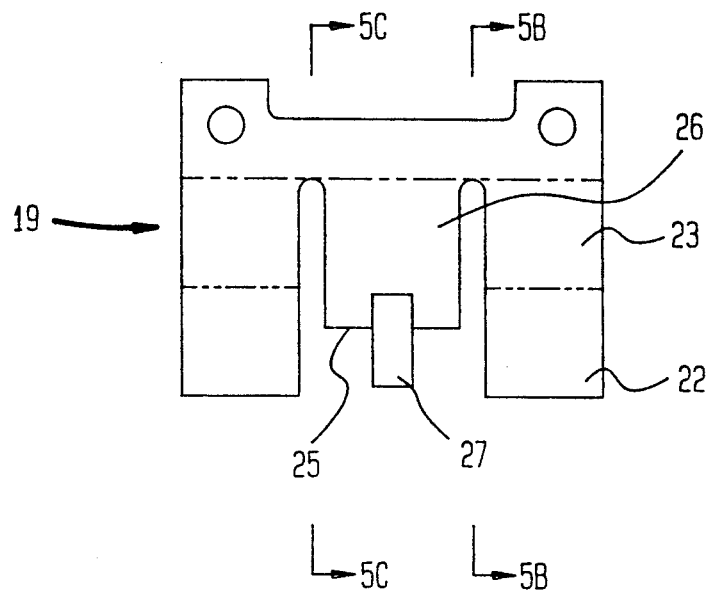
FIG. 5a is an enlarged view of the spring plate of FIG. 4.
Figure 5B:
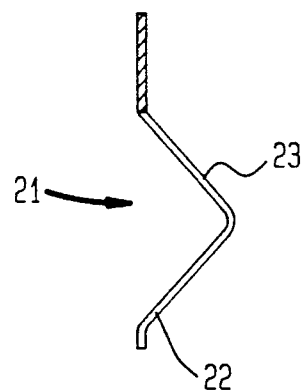
FIG. 5b is a cross sectional view of a spring arm.
Figure 5C:
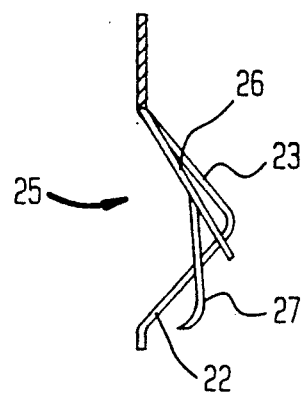
FIG. 5c is a cross sectional view of a retaining spring.

Referring to FIGS. 3, 4, and 5 a–c, each locking pad 17 has a spacing lip 18 and incorporates a spring plate 19, which is attached preferably by bolting or welding to the pad. Each spring plate 19 has a pair of spring arms 21 which have sloped surfaces 22 and 23 to ease entry and exit into the nozzle. These spring arms mate with recesses 20 in the nozzle 2, and bias the shroud into maintaining it's engagement with the recess.

Referring to FIGS. 3 and 5a–5c, a separate retaining spring 25 locks the pad in it's engaged position. The retaining spring 25 has an angle surface 26 leading to an angled tab 27. As the angle surface 26 engages a shoulder 24 of the bottom nozzle 2, it causes the angled surface 26 to be deflected as the shroud is inserted in nozzle 2. Once the spring arms 21 seat in their respective recesses 20, the angle tabs 27 contact shoulders 24 and prevent the shroud from being withdrawn. Before the shroud can be removed, the retaining spring 25 must be released.

Figure 6B:
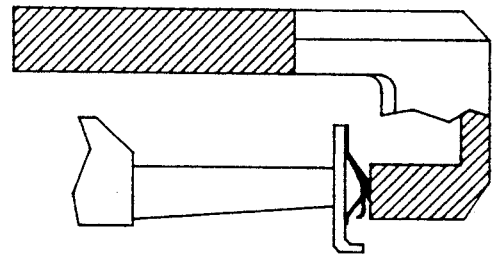
FIG. 6b shows the springs partially retracted during mounting in the nozzle.
Figure 6A:
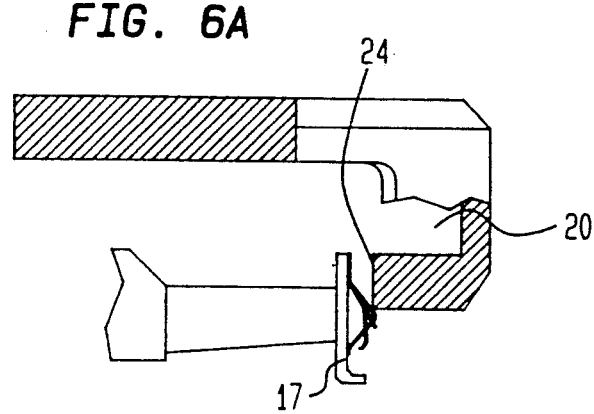
FIG. 6a shows the end pad spring in an extended condition prior to mounting in the nozzle.

FIG. 6a shows the spring 25 in a relaxed condition prior to mounting, FIG. 6b shows the springs at maximum deflection, traveling across a shoulder 24 in the nozzle 2.

The shroud is preferably made of a material compatible with nuclear reactor service. For example, the shroud may be composed stainless steel, zirconium, or a zirconium alloy such as Zircaloy-2 or -4. The springs may be made of the same materials or of a nickel alloy material such as Inconel. In addition, the number and types of spring means and/or arms may vary depending on the location of the shroud within the fuel assembly.

Utilizing the thimble tube shroud of the present invention, having arms and spring pads, prevents rotation or shifting of the shroud and prevents damage to the instrument thimble tube. Also, the shroud reduces and redirects flow around the instrument thimble tube without detrimentally affecting cooling or flow of the coolant about the instrument thimble tube. Consequently, the inventive shroud prevents vibration damage to the instrument thimble tube passing therethrough, enhancing life of the instrumentation and allowing continued observation of dynamics within the nuclear reactor.

While preferred embodiments of the present invention have been shown and described, it will be understood by those skilled in the art that various changes and modifications could be made without varying from the scope of the present invention.

I claim:

1. In a nuclear reactor having a core, a core support plate, a flow distribution plate, an instrument guide thimble extending into the core from the flow distribution plate, in-core instrumentation means for monitoring reactor operations extendable through the core support plate and flow distribution plate into the guide thimble, and, means for reducing flow induced vibration of the instrumentation means comprising:

an instrument shroud disposed between the core support plate and flow distribution plate and having a cup with first and second openings for passing the instrument means therethrough, the first opening disposed adjacent an opening in the flow distribution plate and being of sufficient diameter to allow fluid flow into the instrument guide thimble, the second opening disposed adjacent to the core support plate and being of sufficient diameter to allow fluid flow into the cup, the cup having passages for diverting part of the fluid flow received from the second opening away from the instrument guide thimble, and, one or more shroud arms extending radially from the cup for engaging a substantially parallel core structure, each shroud arm having means for engaging the adjacent core structure at an end thereof, said engaging means having a locking pad disposed at the end of each shroud arm and spring means extending resiliently from each pad for biasing the shroud into position, the shroud arms preventing movement of the shroud due to fluid flow.

2. The shroud of claim 1 wherein the cup has a cylindrical shape.

3. The shroud of claim 1 wherein the cup has an upper inwardly tapered surface with the passages located therein.

4. The shroud of claim 1 wherein four shroud arms extend from the cup.

5. The shroud of claim 1 wherein the spring means comprise a spring plate having one or more spring arms for biasing the shroud arms into position, recesses provided in the adjacent core structure for accepting the spring arms therein.

6. The shroud of claim 5 further comprising a retaining spring extending from the spring plate for locking the shroud arm in position.

7. The shroud of claim 5 wherein each spring arm has first and second sloped surfaces.

8. The shroud of claim 6 wherein the retaining spring has an angled surface and an angled locking tab extending therefrom.

9. The shroud of claim 1 wherein the shroud is composed of a material from the group consisting of stainless steel, zirconium, Zircaloy-2, Zircaloy-4, Inconel and nickel alloys.

10. The shroud of claim 1 wherein the shroud is composed of stainless steel.

11. A method for preventing damage to an instrument guide thimble in a nuclear reactor having a core, a core support plate, a flow distribution plate, an instrument guide thimble extending into the core from the flow distribution plate, in-core instrumentation means for monitoring reactor operations extendable through the core support plate and flow distribution plate into the guide thimble, and, means for reducing flow induced vibration of the instrumentation means, the method comprising:

providing an instrument guide thimble shroud having a cup with first and second openings for passing the instrument means therethrough, the first opening disposed adjacent an opening in the flow distribution plate and being of sufficient diameter to allow fluid flow into the thimble tube, the second opening disposed adjacent to the core support plate and being of sufficient diameter to allow fluid flow into the cup, the cup having passages for diverting part of the fluid flow received from the second opening away from the instrument guide thimble, and, one or more shroud arms extending radially from the cup for engaging a substantially parallel core structure, each shroud arm having means for engaging the adjacent core structure, the engaging means having a locking pad disposed at the end of each shroud arm and spring means extending resiliently from each pad for biasing the shroud into position, the shroud arms preventing movement of the shroud due to fluid flow;

placing the instrument thimble tube shroud between the fuel assembly flow distribution plate and the reactor support plate; and, placing an instrument guide thimble within the shroud.

* * * * *